US012518937B2

(12) United States Patent
Lang et al.

(10) Patent No.: US 12,518,937 B2

(45) Date of Patent: Jan. 6, 2026

(54) ELECTRIC SWITCHING DEVICE FOR MEDIUM- AND/OR HIGH-VOLTAGE USES

(71) Applicants: Siemens Aktiengesellschaft, Munich (DE); Siemens Energy Global GmbH & Co. KG, Munich (DE)

(72) Inventors: Steffen Lang, Hallerndorf (DE); Martin Koletzko, Baiersdorf OT Igelsdorf (DE); Igor Ritberg, Forchheim (DE)

(73) Assignees: SIEMENS AKTIENGESELLSCHAFT, Munich (DE); SIEMENS ENERGY GLOBAL GMBH & CO. KG, Munich (DE)

(*) Notice: Subject to any disclaimer, the term of this patent is extended or adjusted under 35 U.S.C. 154(b) by 256 days.

(21) Appl. No.: 18/257,533

(22) PCT Filed: Dec. 14, 2021

(86) PCT No.: PCT/EP2021/085728

§ 371 (c)(1),
(2) Date: Jun. 14, 2023

(87) PCT Pub. No.: WO2022/129073

PCT Pub. Date: Jun. 23, 2022

(65) Prior Publication Data

US 2024/0047159 A1 Feb. 8, 2024

(30) Foreign Application Priority Data

Dec. 15, 2020 (EP) .................................... 20214203

(51) Int. Cl.
*H01H 33/662* (2006.01)

(52) U.S. Cl.
CPC ................ *H01H 33/66207* (2013.01); *H01H 2033/6623* (2013.01)

(58) Field of Classification Search
CPC ............ H01H 33/16; H01H 33/66207; H01H 33/662; H01H 2033/6623; H01H 2033/66223

(Continued)

(56) References Cited

U.S. PATENT DOCUMENTS 5,597,992 A * 1/1997 Walker ............... H01H 33/6606 218/138
5,808,258 A * 9/1998 Luzzi ............... H01H 33/66207 218/138

(Continued)

FOREIGN PATENT DOCUMENTS

EP 3 146 551 6/2020 ........... H01H 33/662
JP 2004 306528 11/2004 ............. B32B 27/38

(Continued)

OTHER PUBLICATIONS

Translation of JP2004306528 (original document published Apr. 11, 2004) (Year: 2004).*

(Continued)

*Primary Examiner* — William A Bolton

(74) *Attorney, Agent, or Firm* — Slayden Grubert Beard PLLC

(57) ABSTRACT

Various teachings of the present disclosure include an electrical switching device. The device may include: two contactable conductor elements with adjustable spacing set by a movement apparatus; and a housing defining a switching chamber and at least partially surrounding the at least two conductor elements. The housing has an insulator body and regions of an electrical contact. The housing includes an external refraction-controlling coating with a dielectrically insulating matrix made of a material with a permittivity $\varepsilon_r >/= 2$.

16 Claims, 3 Drawing Sheets

(58) Field of Classification Search
USPC .......................................... 218/139, 138, 134
See application file for complete search history.

(56) References Cited

U.S. PATENT DOCUMENTS

| | | | | |
|---|---|---|---|---|
| 7,239,492 | B2 * | 7/2007 | Heimbach | H01H 33/662 361/8 |
| 7,397,012 | B2 * | 7/2008 | Stepniak | H01H 33/02 218/139 |
| 7,579,571 | B2 * | 8/2009 | Siebens | H01H 33/666 218/120 |
| 10,049,840 | B2 * | 8/2018 | Gentsch | H01H 33/6606 |
| 10,102,989 | B2 * | 10/2018 | Hartmann | H01H 33/662 |
| 2004/0040935 | A1 | 3/2004 | Heimbach | 218/7 |
| 2004/0242034 | A1 * | 12/2004 | Rinehart | H01H 33/662 439/100 |
| 2010/0314357 | A1 * | 12/2010 | Kobayashi | H01H 33/66207 218/140 |
| 2016/0126037 | A1 * | 5/2016 | Gerovac | H01H 33/666 218/139 |
| 2016/0181027 | A1 * | 6/2016 | Cao | H01H 33/66207 218/139 |
| 2017/0213674 | A1 | 7/2017 | Hartmann | H01H 33/66207 |
| 2020/0027673 | A1 | 1/2020 | Benkert | H01H 33/66207 |

FOREIGN PATENT DOCUMENTS

| | | | |
|---|---|---|---|
| JP | 2020087787 A | 6/2020 | H01H 33/662 |
| WO | 2002 097839 | 12/2002 | H01H 33/66 |
| WO | 2018 137903 | 8/2018 | H01H 33/662 |

OTHER PUBLICATIONS

Search Report for International Application No. PCT/EP2021/085728, 10 pages, Mar. 23, 2022.
Korean Office Action, Application No. 1020237023780, 5 pages, Nov. 15, 2024.

* cited by examiner

ELECTRIC SWITCHING DEVICE FOR MEDIUM- AND/OR HIGH-VOLTAGE USES

CROSS-REFERENCE TO RELATED APPLICATIONS

This application is a U.S. National Stage Application of International Application No. PCT/EP2021/085728 filed Dec. 14, 2021, which designates the United States of America, and claims priority to EP Application No. 20214203.0 filed Dec. 15, 2020, the contents of which are hereby incorporated by reference in their entirety.

TECHNICAL FIELD

The present disclosure relates to electrical switching devices. Various embodiments of the teachings herein may be used in particular for medium-voltage and/or high-voltage applications.

BACKGROUND

In the case of medium-voltage and/or high-voltage applications, that is to say, generally speaking, in the case of voltages that are greater than 1 kV, due to the high voltages, there is a need for relatively complex switching devices that are able to withstand the electric fields that occur, are as resistant as possible to degradation effects and are also intended to avoid arcing outside the actual switching chamber. One conventional example of these are vacuum circuit breakers (VCB), which are key components in energy transmission and distribution, in particular in the switching systems thereof. They cover the majority of medium-voltage switching applications, that is to say switching applications for example in the range from 1 kV to 52 kV, and a relevant portion in low-voltage systems.

Use thereof in high-voltage transmission systems, for example in the case of voltages greater than 52 kV, is also increasing. While a VCB is closed most of the time, and accordingly provides contacting between the conductor elements, its main task is that of interrupting currents in AC current systems during nominal conditions, that is to say in particular in order to activate and deactivate nominal currents, or else preferably to interrupt currents in fault conditions, in particular in order to interrupt short circuits and to protect the system. Other applications comprise purely switching load currents using contacting conductor elements, this mostly being used in low-voltage and medium-voltage systems.

The vacuum interrupter (VI) is the core element of a VCB. A vacuum interrupter usually has a pair of contacts that are formed by corresponding conductor elements, at least one of which is able to be moved by way of a movement apparatus in order to be able to bring about the open and closed states of the switching device. In this case, one conductor element is usually moved axially in relation to the other, fixed, conductor element. The contacts may be made from current-conducting bolts, in particular consisting of metal, which provide conduction of both current and heat, and the magnetic means for holding and/or for moving the contacts.

A VI furthermore comprises a vacuum-tight housing, and the mentioned movement apparatus may additionally comprise a metal bellows that is connected on one side to the housing and on the other side to the moved conductor element, in particular the moved bolt. The housing is formed essentially by an insulating component, that is to say an insulator, for example a ceramic tube that is connected to the conductor elements via connecting elements, with for example metal caps or the like being used, these terminating the insulating component in the axial direction so as to form the switching chamber. Within the switching chamber, a permanent high vacuum of less than 10ˆ−4 hPa or 10ˆ−4 mbar prevails. The vacuum is necessary to ensure the "make-break operations" and to guarantee the insulation properties of the switching device in the open state.

When the switching device is in an open state, it is necessary to isolate the nominal voltage of the system, on the one hand, but also high-amplitude impulse voltages, which may be triggered for example by a lightning strike on the system, on the other hand. When the switching device transitions from the closed to the open state, and the contacts of the conductor elements are accordingly spaced, it is necessary to interrupt nominal currents or short-circuit currents that lead to the occurrence of transient voltage spikes across the VI that are considerably greater than the nominal AC voltages of the system.

High voltages in vacuum systems usually generate free electrons through field emission processes when the electric field strength is high enough. The acceleration of the electrons in the high electric fields increases the kinetic energy of these electrons, for example up to energies that exceed several tens or even hundreds of KeV. The interaction between these high-energy electrons and the housing structures leads to the production of high-energy X-ray radiation, which may leave the vacuum interrupters. While, under normal conditions, the fault current within the vacuum interrupters is minimal and does not generate any noteworthy X-ray radiation components, circumstances may occur, for example when transient high-amplitude voltage spikes occur, in which the X-ray radiation that arises generates free electrons at and/or close to the outer surface of the insulator. These electrons may be accelerated by the electric fields on the insulator surface and in the vicinity thereof, interfere with the electrical field distribution in sensitive regions and lead to gas discharge, which leads to a fault during operation of the vacuum interrupters.

Also in cases in which no identifiable X-ray radiation exists, for example in low-voltage and medium-voltage applications, the high electric fields in critical regions of the vacuum interrupters, for example at the welded (hard-welding) connection between the insulator and the metal caps, may lead to the ejection of electrons, which leads to a noticeable amount of field emission. These electrons may also locally interfere with the electric field and lead to further field amplification and/or to charge multiplication through electron avalanches, which may in turn result in the loss of insulation strength and/or voltage resistance of the vacuum interrupters.

Similar challenges exist on the inner surfaces of the vacuum interrupters, while an additional problem has to be solved. Due to the interruption of the current (nominal current and also short-circuit current), parts of the contact material are vaporized and distributed within the switching chamber in the form of hot metal vapor. This metal vapor may be deposited on the insulator surface and builds up a conductive metal layer over time. This metal layer, even though it is only weakly conductive, may likewise interfere with the electric field outside and inside the vacuum interrupters and accordingly worsen the voltage withstand of the vacuum interrupters over time. Although it has been proposed in this context to provide a shielding element, which may likewise consist of metal, to capture free metal particles of the conductor elements in the contacting region of the conductor elements, this shielding element also has an influence on the field distribution within the switching chamber, but also on the insulator.

For the stated reasons, the housing of the switching chamber, in particular including the insulator, which is made mostly of ceramic, must be capable of withstanding high voltages across the respective surface, even when X-ray radiation and free electrons are present or, in some cases, even when the insulator is polluted by dust particles that build up electrostatically on the outer surface of the insulator. Since the insulator makes a noteworthy contribution to the costs of a vacuum interrupter (or other switching devices) and also has a negative influence on the costs of other structural elements of the vacuum interrupters (or other switching devices), it is necessary to optimize the housing in terms of maximum dielectric strength while keeping a minimum component size.

This problem has been solved up to now by selecting the inner and the outer geometry of the vacuum interrupters such that the expected electric field strengths do not exceed empirically derived limits for a particular geometry of the vacuum interrupters. Since these limits cannot be predicted precisely, in particular for triple point regions and/or sharp metal edges, the design of vacuum interrupters depends not only on calculations regarding the electric field during the development process, but also requires a large amount of empirical optimization. This also relates to the structure of metal layers on the inner surfaces of the insulator, which, as already mentioned, are nowadays usually intended to be avoided by using shielding structures (shielding elements) within the switching chamber. Nevertheless, the deposition of metal vapor and the influence thereof on the dielectric strength of the vacuum interrupter VI cannot at present be predicted quantitatively in a sufficiently accurate manner.

It should furthermore be noted that the stated design processes all lead to a reduction in the insulation properties of the external structure of the vacuum interrupters to significantly below the dielectric strength of air or other gases surrounding the vacuum interrupters, meaning that there is a requirement for housing sizes and/or insulator sizes that are not optimal—in terms of length and/or diameter—with regard to costs and installation space. The addition of shielding elements in relation to the metal vapors leads to distortions of the electric fields that occur during operation at the insulator, which may lead to strong fields at certain points and accordingly to overloading of the insulator due to charges building up there. However, other causes also lead, as already explained, to such local high fields at the insulator of the housing of the vacuum interrupters, with the problems set forth here also applying to other switching devices, such as for example gas switches in addition to the vacuum interrupters cited by way of example.

Generally speaking, the known VIs are often largely structured to be symmetrical about an—imaginary—center plane of the interrupters in order to minimize the number of different components and the complexity of the structure. However, the real environment of the interrupters generally distorts the electric field to a great extent, meaning that regions of the interrupters are electrically intense—in the sense of a high average electric field strength.

There is therefore the need to manage the different requirements in terms of dielectric strength, such as high lightning impulse voltages with highly transient switching edges—for example 1.2 μm rise time and an exponentially falling return edge with a time constant of 50 μs, nominal voltages of 50 Hz or 60 Hz fundamental frequency with harmonic components up to into the kHz range, and so-called nominal power-frequency withstand voltage 50/60 Hz at up to twice the nominal voltage amplitude, for up to a minute loading duration, through the design of the switching device.

SUMMARY

The teachings of the present disclosure include switching devices having a housing comprising an insulator and axial terminating caps that exhibits increased dielectric strength with minimum installation size and production costs of the switching device, in particular a switching device that exhibits improved dielectric strength in particular in the strongly electrically loaded regions of the housing. For example, some embodiments include an electrical switching device (1) having at least two contactable conductor elements (6) that are able to be spaced by a movement apparatus (9), and having a housing (3) that defines a switching chamber (5) and that at least partially surrounds the conductor elements (6), wherein the housing (3) has an insulator body (2) and regions of an electrical contact (4) and wherein the housing (3) externally at least partially has a refraction-controlling coating (13) that has a dielectrically insulating matrix made of a material with a permittivity $\varepsilon_r$>/=2.

In some embodiments, the matrix of the refraction-controlling coating (13) is present in a manner containing filler.

In some embodiments, the refraction-controlling coating is present at least in a region of an electrical contact (4).

In some embodiments, the material of the filler particles of the at least one filler fraction is a ceramic with a permittivity $\varepsilon_r$>/=3 and $\varepsilon_r$</=200.

In some embodiments, the material of the filler particles of the at least one filler fraction comprises a ceramic containing at least one metal oxide, a metal mixed oxide and/or a titanate.

In some embodiments, the matrix contains a total amount of filler particles in the range from 1% by volume to 70% by volume.

In some embodiments, the resin is selected from the group of elastomers, thermosetting plastics, thermoplastics and/or glass.

In some embodiments, the matrix is a polymeric resin and/or a polymeric resin mixture.

In some embodiments, the polymeric resin or the polymeric resin mixture comprises at least one compound selected from the group of the following compounds: epoxy resin, silicone elastomer, siloxane resin, silicone resin, polyvinyl alcohol, polyesterimide, and any mixtures and/or combinations of the above compounds.

In some embodiments, the refraction-controlling coating is provided in combination with at least one further coating on the outer surface of the housing (13).

In some embodiments, the further coating is a resistive coating.

In some embodiments, the resistive coating completely or partially covers the housing outer surface.

In some embodiments, the refraction-controlling coating (13) is provided at least partially above the resistive coating.

In some embodiments, the refraction-controlling coating is present with a layer thickness of less than/equal to 5 mm.

In some embodiments, the refraction-controlling coating is present with a layer thickness of less than/equal to 2 mm.

In some embodiments, the refraction-controlling coating is able to be applied as a wet varnish.

In some embodiments, the refraction-controlling coating is able to be applied as a powdered varnish.

In some embodiments, the switching device is a vacuum switch or a gas switch.

DETAILED DESCRIPTION

Figure 1:
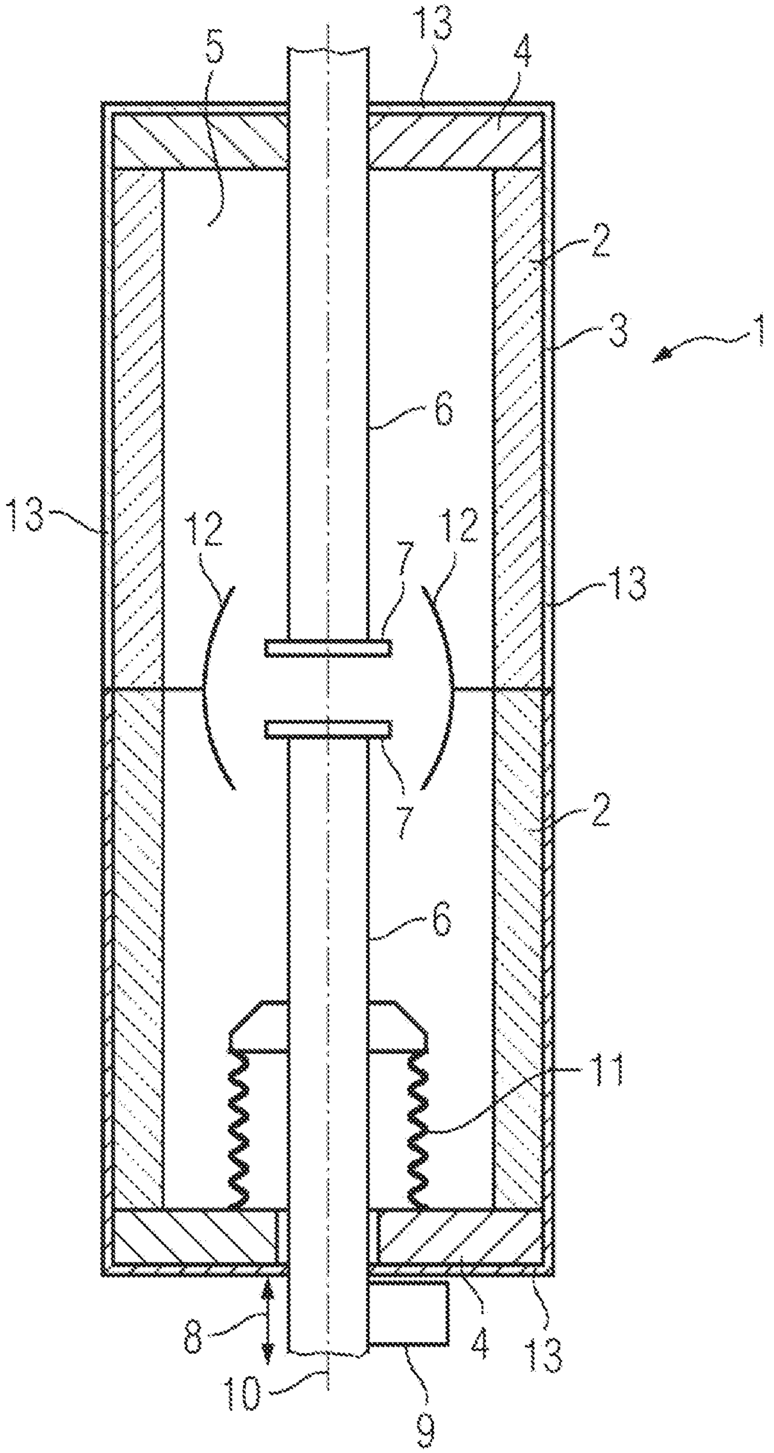
FIG. 1 is a schematic drawing showing an example switching device incorporating teachings of the present disclosure in the form of vacuum interrupters.

Various embodiments of the teachings of the present disclosure include electrical switching devices having at least two contactable conductor elements that are able to be spaced by a movement apparatus, and having a housing that defines a switching chamber and that at least partially surrounds the conductor elements, wherein the housing has an insulator body and regions of an electrical contact and wherein the housing externally at least partially has a refraction-controlling coating that has a dielectrically insulating matrix, possibly containing filler, with a permittivity $\varepsilon_r$>/=2. By virtue of an insulating, refraction field-controlling coating, the housing of an electrical switching device exhibits improved dielectric strength when this coating is insulating and is applied externally partially or over the whole surface of the housing and thus forms the interface of the housing to the environment—for example ambient atmosphere, or air.

In some embodiments, the coating has a permittivity that is significantly increased in relation to a conventional protective varnish, which in turn is attributed not to the permittivity of the matrix material, that is to say of the binder, but rather to the permittivity of the fillers contained therein, which in particular examples have a high lattice polarization. A high permittivity of the polymeric and, in some cases, organic material matrix is not advantageous due to degradation effects that may be feared, because organic materials do not exhibit lattice polarization, but rather what is known as orientation polarization.

"Lattice polarization" denotes the property of a—for example ceramic—material that is present as a solid in the form of a crystal lattice, which material has ionic character, that is to say internal dipoles, and reacts to the presence of an electric field "only" through a slight displacement of the individual ions within the lattice. The stability of this material in the electric field remains high even at relatively high switching frequencies of—for example 50 Hz—and at high applied field strengths.

It behaves differently in the case of polymeric matrix materials that likewise exhibit permittivity, in the case of polyvinyl alcohol, for example of up to 9, these exhibit what is known as "orientation polarization", this meaning that entire molecules or groups of molecules rotate and reorient themselves as a result of the electric field being changed over. These materials are stressed and destabilized by switching processes. This may bring about undesirable degradation effects through switching processes, which may, in the worst-case scenario, lead to the destruction of the material and thus to the destruction of the coating.

"Permittivity" denotes the polarization capability of a material as a result of electric fields. Permittivity is a material property of electrically insulating polar or nonpolar compounds that comes to the fore only when these compounds are exposed to an electric field.

In some embodiments, the matrix material may comprise elastomers, thermosetting plastics, thermoplastics, and/or glass. The various coating processes for producing the coating may be selected accordingly.

In some embodiments, the matrix material is applied as varnish, in particular in the form of a wet varnish or powdered varnish. Other application methods, such as spraying, immersion bath, casting etc. are conceivable. Application as a powdered varnish and/or wet varnish provides a refraction-controlling coating that is free from pores. Such freedom from pores is also achieved by casting, but in this case the homogeneity of the coating generally suffers, in particular at the edges. In the case of application as a wet varnish, this generally comprises solvents that are no longer present, or are still present only in small amounts, in the matrix material after the varnish has dried.

In some embodiments, the matrix consists of a polymeric matrix material, for example a polymeric resin that is present in the form of a polymeric binder. A "polymeric matrix" denotes a polymer or a polymeric binder. The polymeric matrix comprises in particular a resin or a resin mixture, such as epoxy resin, silicone elastomer, siloxane resin, silicone resin, polyvinyl alcohol, polyesterimide and similar duroplastic, thermoplastic synthetic materials, and any combinations, copolymers, blends and mixtures of the above-mentioned resins and/or synthetic materials. The polymeric matrix may be present in filled or unfilled form as a coating with a permittivity of $\varepsilon_r$>/=2.

In some embodiments, the matrix contains fillers with a high permittivity in relation to air, in particular refractive dielectrically insulating fillers, such as ceramic fillers that are polar and/or able to be polarized slightly in the electric field. In some embodiments, the materials for the one or more fillers are selected from class 1 ceramic materials that satisfy high requirements in terms of stability and the permittivities of which have a low temperature dependency and field strength dependency. These include for example compounds such as selected titanates, which exhibit reproducibly low temperature coefficients and low dielectric losses. Their permittivity is largely field strength-independent, which has advantages for the application discussed here.

The ceramic materials considered here in particular for the one or more fillers have relative permittivities E r in the range from $\varepsilon_r$>/=2 to $\varepsilon_r$</=200, e.g. from $\varepsilon_r$>/=10 to $\varepsilon_r$</=100.

In some embodiments, the fillers are made of a material that is commercially available from the field of capacitor ceramics and is therefore comparatively inexpensive and obtainable in sufficient quantities. These include in particular materials that exhibit an almost linear temperature characteristic of the capacitor capacitance. By way of example, these are present in the form of one or more ceramics, in particular one or more ceramics containing metal nitride, metal carbide, metal boride and/or metal oxides such as titanium dioxide, aluminum dioxide, selected compounds of titanate-containing ceramic, are likewise suitable due to their field strength-independent permittivity. In addition to mixed oxides, such as titanate and/or mixtures of various metal oxides, oxides of metal alloys in any combination with all of the abovementioned materials are in particular also suitable for fillers exhibiting largely field strength-independent permittivity.

In some embodiments, a mixture of finely ground paraelectric materials such as titanium dioxide with admixtures of magnesium (Mg), zinc (Zn), zirconium (Zr), niobium (Nb), tantalum (Ta), cobalt (Co) and/or strontium (Sr) is used as a filler. The following compounds are mentioned here by way of example: $MgNb_2O_6$, $ZnNb_2O_6$, $MgTa_2O_6$, $ZnTa_2O_6$, such as for example $(ZnMg)TiO_3$, $(ZrSn)TiO_4$ and/or $Ba_2Ti_9O_{20}$, and any combinations and mixtures of said compounds.

In the case of application in the form of powdered varnish, conventional additives, such as curing agents, accelerators and/or additives may possibly be contained in the amounts conventionally recognized as advantageous. Both thermosetting plastics and thermoplastics may be applied in the form of a powdered varnish.

A curing agent is present in this case when additive polymerization takes place. An accelerator, initiator and/or catalyst may be used in all cases in which resin is cured.

In some embodiments, the matrix material is generally applied before, during but after the housing has been produced. By way of example, the refraction-controlling layer, which is produced by coating with the matrix material, is applied by spraying, scraping, immersion, painting and/or other methods that enable the production of a coating that is thin and homogeneous—in particular as homogeneous as possible and as free from pores as possible. In some embodiments, the application method is performed in an automated manner.

In some embodiments, the refraction-controlling coating is a filled coating made of one or more matrix materials that may be organic, for example in the form of a polymer, or inorganic, for example as glass, in which the filler is introduced. The amount of filler in the refraction-controlling coating may vary within broad limits. For instance, there may be a filler concentration of 1% by volume—that is to say the almost unfilled matrix material with a low refraction that is brought about almost only by dielectric barriers formed by the matrix material, up to a fill level of 70% by volume in the coating. The preferred range of amount of filler in this case lies between 20 to 60% by volume, in particular 30% by volume to 40% by volume fill level in the matrix material.

Figure 3:
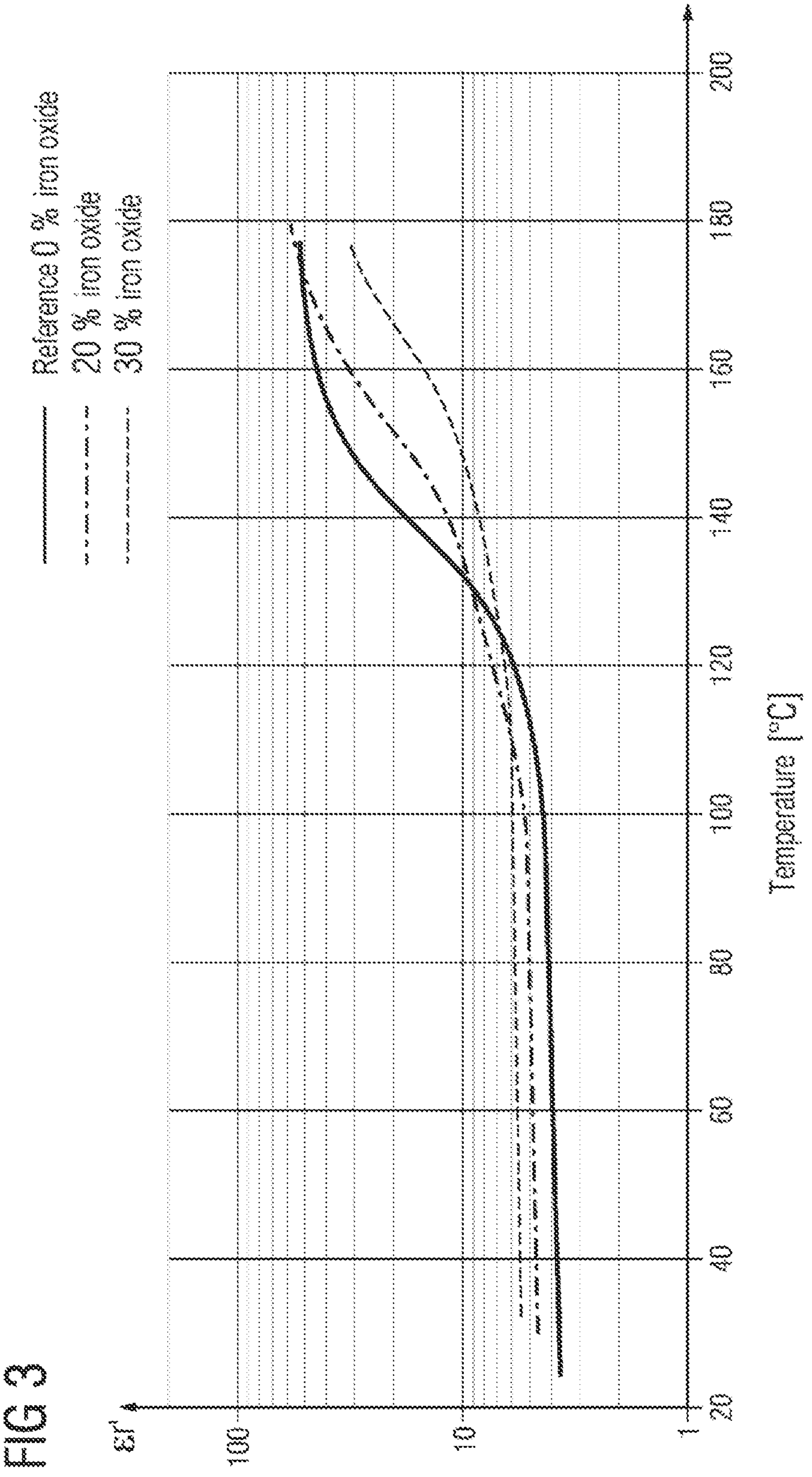
FIG. 3 shows the graphs for measuring the permittivities of the filled synthetic materials mentioned by way of example and the unfilled reference sample of the pure matrix material.

Examples—See FIG. 3

In a matrix of anhydritically cured epoxy, a filler based on iron oxide is introduced. The unfilled matrix material—epoxy resin—under the conditions exhibits a permittivity of 3.8 measured at ° C.

Filled with 30% by weight iron oxide-based filler results in a permittivity of 5.6 at 30° C. and filled with 20% by weight iron oxide-based filler results in a permittivity of 4.7, again measured at 30° C.

The measurements and observations suggest the following assumptions: At room temperature or slightly above (30° C.), permittivity is accordingly increased by adding ceramic iron oxide filler particles. This is based primarily on the lattice polarization brought about by the filler and slight orientation and interface polarization of the polymeric binder.

Starting from a temperature of 120° C., which corresponds to the glass transition temperature of the polymer, the bonding energy of the hydrogen bridge bonds is thermally overcome, as a result of which these polar groups are then able to move “freely” in the electric field starting from this temperature. The orientation polarization accordingly increases drastically, which is reflected in a significant increase in permittivity.

By adding filler, this effect is accordingly overlaid percentagewise by the filler.

The aim is to increase permittivity through lattice polarization, for example by adding filler that is present in solid form, in particular crystalline form. The aim is not to achieve high permittivity through the orientation polarization of the polymeric binder. A polar synthetic material with a Tg at room temperature or lower would accordingly have exorbitantly high permittivities at 30° C. This is however intended to be avoided. The reason is that the chemical sigma bonds of the polar groups, at a polarization change of 50 times per second—this corresponds to Hz and a correspondingly high electric field strength—degrades during operation and the permittivity and other material properties thus change.

This leads to loading over the service life that, in the technology discussed here, is roughly 40 years, and over this time interval, constant field-controlling properties of the layer should be more or less guaranteed.

The filler particles of the refraction-controlling coating do not have a preferred form; they may be present in any forms and sizes in a manner embedded in the matrix. By way of example, the filler particles are present in irregular form following appropriate grinding.

Filled varnishes, the particles of which as far as possible have a roughly spherical shape, are more suitable for processing than other forms, because in this case the specific surface area is smallest and thus a smallest possible processing viscosity is achieved for the same fill level.

The size of the fillers may vary. There may be different fractions of filler present in the filler. The housing may be provided with differently filled coatings in different regions.

In the case of thicker coatings and/or in the case of particular material combinations, there is higher refraction for some field lines than for others. The level of the permittivity and the thickness of the applied refraction-controlling coating in this case defines the extent to which the electric field is homogenized.

In some embodiments, thicknesses of the refraction-controlling coating of 10 μm to 5 mm, in the range between 100 μm and 3 mm, and/or in the range between 500 μm and 2 mm, have proved to be expedient.

In some embodiments, the permittivity of the coating is used—in filled or unfilled form—so that, due to the permittivity, which is increased in relation to the uncoated surface, the electric field is pushed away on the surface of the housing of the switching chamber and local field elevations are thus reduced. This is illustrated schematically and explained once again in FIG. 2.

Without the refraction-controlling layer, an insulating gas such as nitrogen, air or sulfur hexafluoride would normally be on the surface of the housing. All of these gases have a low permittivity. Air for example has the permittivity $\varepsilon_r$=1.00059. A coating made of a synthetic material such as a resin on the other hand has a permittivity of at least twice that value $\varepsilon_r$=2—for example silicone resin—up to around $\varepsilon_r$=9—for example polyvinyl alcohol. This refers to the cured resins. Preference is given to using synthetic materials with low permittivity, so that no degradation effects are brought about by the switching processes.

The refraction-controlling coating proposed here means that the field lines that emanate are refracted in accordance with the refractive field control, because, due to field penetration from the material with a higher dielectric constant into the material with a lower dielectric constant, the penetration of the field into the one with higher permittivity is made more difficult, since the electric field is pushed away from the edge or the triple point.

Triple point is the name given for example to the region of the housing in which a metal electrode, a solid insulator and a gaseous insulator—that is to say the surrounding gas here—come together.

In some embodiments, the refraction-controlling coating is applied at least in part at least to one of the contacting sides of the housing. This is in particular because the refraction-controlling coating is at the same time also a dielectric barrier that, applied to the metal electrodes, ensures that it is considerably more difficult for electrons to escape from the metal housing. Or, in other words, the electric arcing between the electrodes is shifted to higher voltages by the dielectric barrier. There may be another additional shift to even higher voltages through the refractive field shift.

In some embodiments, the refraction-controlling coating is provided on both metal caps of the housing, which axially terminate the insulating body so as to form the switching chamber, completely or partially in addition to application to the insulator body. The refraction-controlling coating thus covers the housing completely or partially or in selected regions. The refraction-controlling coating is applied for example directly to the housing surface or for example also to a lower layer, such as for example a resistive layer according to EP 3146551 B1.

A lower layer, to which the refraction-controlling coating is applied, may be both a further refraction-controlling layer and another, in particular a resistive layer according to EP 3146551 B1, but maybe, in a departure therefrom, a resistive capacitive layer.

In some embodiments, the lower layer is in this case a thinner layer than the upper one, meaning that the layer thicknesses increase from the inside to the outside on the housing outer surface.

In the case of a coating on a resistive lower layer, provision is made in particular for the matrix materials of the respective coatings to be compatible with one another. In some embodiments, the matrix materials are at least partially inert to one another, but they may be mixed with one another and/or in one another as desired. In some embodiments, the matrix materials of different layers—that is to say for example the matrix material of a refraction-controlling coating and the matrix material of a resistive coating according to EP 3146551 B1—have the same or a similar chemical composition.

The coatings may also be provided in a manner combined in the form of a layer stack, wherein provision is made for a resistive coating according to EP 3146551 B1, e.g. on the insulating regions of the housing of the switching device, such as for example on a ceramic cylinder, whereas the refraction-controlling coating is provided in particular on the caps of the housing, that is to say the contacting regions. Both coatings may however extend externally over one another as desired and in particular also over all regions of the housing. One resistive coating is what is called an “ohmic coating” with a settable resistance, with a residual conductance always being present. In contrast thereto, the refractive field-controlling coating is an insulating dielectric coating.

In some embodiments, all layers of the overall coating of the housing cover the respective parts of the housing completely or partially, but externally.

In some embodiments, the refraction-controlling coating may be applied to the caps, in particular to the metal caps and/or to the edges formed by the caps with the insulator body.

In some embodiments, the refraction-controlling coating extends beyond the edge—so as to form a periphery—for example including over the surface of the insulator body. In this case, it does not matter whether or not the insulator body itself is still coated, for example provided with a resistive coating.

All possible layer combinations of coatings on the housing, in particular coatings of the resistive coating discussed here in accordance with EP 3146551 B1, on the one hand, and a refraction-controlling coating, on the other hand, are conceivable, for example

- whereby the lower—resistive layer completely covers the entire housing and the upper refraction-controlling layer only partially covers the lower layer;
- whereby the lower layer only partially covers the housing outer surface, in particular whereby the lower layer is applied in the form of a resistive capacitive layer and the upper refraction-controlling layer completely or partially covers the lower layer and the entire housing outer surface;
- whereby the lower layer remains partially uncovered by the upper layer;
- whereby the resistive capacitive regions of the lower layer are covered with the refraction-controlling layer;
- whereby two or more layers of one kind cover different housing regions and in the process do or do not overlap;
- etc.

According to EP 3146551 B1, the resistive layer is applied over the entire area of the housing outer surface; in some embodiments of the teachings herein, in contrast thereto, it may also externally cover the housing only partially; it may in particular also be applied in the form of a resistive capacitive layer with a region that is electrically conductively connected in a non-galvanic manner—that is to say not via a contact.

In some embodiments, the lower layer is thinner than the upper layer. In some embodiments, the refraction-controlling layer lies on the resistive layer.

FIG. 1 shows, in the form of a basic sketch, one embodiment of a switching device 1 incorporating teachings of the present disclosure, here a vacuum interrupter. A housing 3, formed here of two tube-shaped ceramic parts, that is to say insulator bodies, 2, is terminated by metal caps 4, which form regions with electrical contacts, and defines a switching chamber 5 into which two conductor elements 6, designed for example as bolts, with contacts 7 are guided.

The lower one of the conductor elements 6 in FIG. 1 is designed to be movable in accordance with the arrow 8 and the indicated movement apparatus 9 and may be moved in a direction of extent 10 of the conductor elements 6, which also forms the axis of symmetry of the switching device 1, in order to bring the contacts 7 into contact or to space them, wherein in this case an open, that is to say spaced state of the switching device 1 is shown. Due to the mobility of the lower conductor element 6, this is coupled to the metal cap 4 by way of a metal bellows 11; the metal caps 4 are thus conductively connected to the conductor elements 6 on both sides.

A vacuum prevails within the switching chamber 5, in this case with a pressure of $<10^{-4}$ hPa.

Some embodiments include gas switches in which the gas is present inside the switch. The gas switches also included here are understood to mean those in which gas serves as switching medium, on the one hand, and—following successful deactivation—as insulating medium, on the other hand. SF6 is nowadays usually used here. Since SF6, as a harmful greenhouse gas, is intended to be replaced, switches comprising CO2, fluoronitrile, or other alternative gases are conceivable in the future.

In order not to allow metal vapors that arise for example when opening the switching device 1 to reach the inner surface of the insulator 2, here ceramic, provision is made in this case in the switching chamber 5 for a metal shielding element 12 (vapor shield) in the contacting region. This shielding element 12 then however also distorts the electric field, meaning that, in a region behind the shielding elements, there would be a smaller electric field during operation than in the "unshielded" regions, where for example charges may accrue and thus bring about further field distortions that could jeopardize the functionality of the switching device 1.

To counteract this, in the exemplary embodiment outlined here, there is a refraction-controlling coating 13 on the outer surface of the housing 3, that is to say both on the insulator body 3 and on regions of the electrical contacts—that is to say the caps 4. The refraction-controlling coating 13, applied here over the entire surface, in the embodiment shown here comprises a polymeric matrix that is filled with a high-permittivity filler, made from a ceramic material $\varepsilon_r$ in the range from greater than/equal to 2 to 200, e.g. from 10 to 100. The filler is contained in the matrix at 30% by volume. It is a mixture of titanium dioxide and aluminum oxide particles.

The refraction-controlling coating 13 may be relatively inexpensive in terms of price of the material and is able to be sprayed on relatively easily—including automatically. The presence thereof may be easily demonstrated using a scanning electron microscope and elementary analysis.

Figure 2:
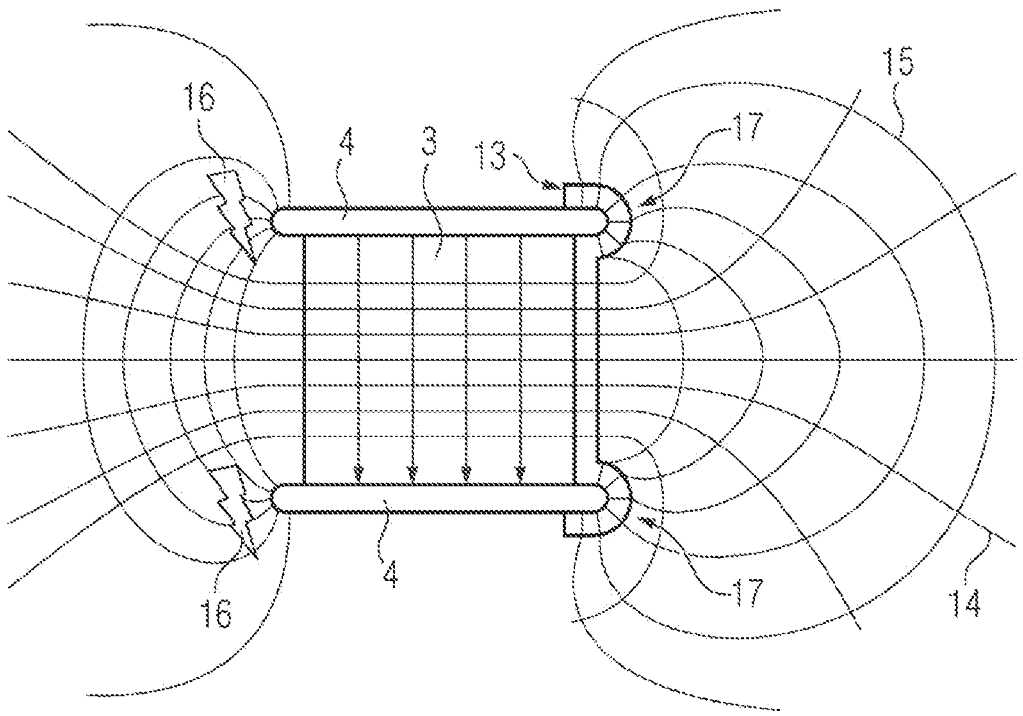
FIG. 2 schematically shows the effect of a refraction-controlling coating on a housing surface of a housing of an example switching device incorporating teachings of the present disclosure.

FIG. 2 schematically shows the effect of a refraction-controlling coating on a housing outer surface such as the housing 3 shown in FIG. 1. FIG. 2 schematically shows the characteristic of the field and equipotential lines 15, 14 in each case at a triple point, right-hand half with a refraction-controlling coating 13 and left-hand half for comparison without such a coating, according to the prior art. As may be seen, the field lines 15 on the left run without refraction from the metal cap 4 into the surrounding gas, for example air. This may result in flash discharges 16. On the right, where the coating 13 lies between metal cap 4 and surrounding air, the field lines 15 at the transition from the high-permittivity coating into the surrounding air are refracted with lower permittivity—see region 17—as a result both the equipotential lines 14 and the field lines 15 are far from one another, meaning that no arcs occur.

The refraction-controlling coatings 13 described herein makes it possible to reduce the length of the housing 3 of a switching device 1 and thus the overall length of the electrical switching device 1. This saves on material costs. A housing 3 for a specific voltage level could for example be produced. Exactly this housing 3 could then be coated with the refraction-controlling coating 13, and thus be able to be used for the next-highest voltage level. In terms of process engineering, this results in a design that may be used for two voltage levels, with the same housing 3 being able to be used for two switching devices 1 of different voltage levels.

The two housings differ from one another only in terms of the additional refraction-controlling coating 13.

FIG. 3 shows the graphs for measuring the permittivities of the filled synthetic materials mentioned by way of example and the unfilled reference sample of the pure matrix material, that is to say 0% filling by weight with iron oxide. The measurements were performed using a device from EPRO Gallspach GmbH "www.epro.at" Type: ITTS 2000; Mains: 90-240 V/50-60 Hz.

The solid line shows the permittivity of the reference sample, the dashed graph shows the example with 30% by weight iron oxide and the graph illustrated with a dot-and-dash line shows the sample filled with 20% by weight iron oxide.

In some embodiments, a refraction-controlling coating is, due to the fact that barely any current flows through this coating, highly resistant to ageing and lasts longer and is more reliable.

In some embodiments, a coating with a high permittivity, or at least a permittivity that is high relative to the surrounding air $\varepsilon_r$=1, made of a synthetic material $\varepsilon_r$>/=2, in particular $\varepsilon_r$>/=3, in particular a filled synthetic material, is completely or partially coating the housing surface of a vacuum interrupter, so that, in critical regions, in particular at triple points, the field lines are refracted and arcs are thus moved as far as possible away from one another and flashes are thus prevented. The coating, comprising matrix material and filler, preferably has a permittivity greater than 4, in particular in the range from 3 to 150, preferably from 4 to 100, and particularly preferably from 5 to 50, in each case at room temperature.

The teachings of the present disclosure here is not restricted to vacuum interrupters, but relates to other switches, for example gas-insulated ones—for example those with SF6 and/or clean air as switching gas. In the case of gas switches with clean air, this clean air is generally used only as insulation medium and is not contained in the interrupter unit where the arc arises and the switching operation is performed.

LIST OF REFERENCE SIGNS

1 switching device
2 insulator
3 housing
4 cap
5 switching chamber
6 conductor element
7 contact
8 arrow
9 movement apparatus
10 direction of extent
11 metal bellows
12 shielding element
13 refraction-controlling coating
14 equipotential lines
15 field lines
16 flash
17 region in which field lines are refracted

What is claimed is:

1. An electrical switching device comprising:

at least two contactable conductor elements with adjustable spacing set by a movement apparatus; and a housing defining a switching chamber and at least partially surrounding the at least two conductor elements;

wherein the housing has an insulator body and regions of an electrical contact; and wherein the housing includes an external refraction-controlling coating with a dielectrically insulating matrix made of a material with a permittivity εr>/=2;

wherein the dielectrically insulating matrix comprises ceramic filler particles with a permittivity εr>/=3 and εr</=200.

2. The switching device as claimed in claim 1, wherein the refraction-controlling coating is present at least in a region of an electrical contact.

3. The switching device as claimed in claim 1, wherein the ceramic filler particles comprise at least one metal oxide, a metal mixed oxide, and/or a titanate.

4. The switching device as claimed in claim 1, wherein the matrix contains a total amount of filler particles in a range from 1% by volume to 70% by volume.

5. The switching device as claimed in claim 1, wherein the dielectrically insulating matrix is selected from a group consisting of: elastomers, thermosetting plastics, thermoplastics and/or glass.

6. The switching device as claimed in claim 1, wherein the dielectrically insulating matrix comprises a polymeric resin.

7. The switching device as claimed in claim 6, wherein the polymeric resin comprises at least one compound selected from the group consisting of: epoxy resin, silicone elastomer, siloxane resin, silicone resin, polyvinyl alcohol, and polyesterimide.

8. The switching device as claimed in claim 1, further comprising at least one further coating on an outer surface of the housing.

9. The switching device as claimed in claim 8, wherein the at least one further coating comprises a resistive coating.

10. The switching device as claimed in claim 9, wherein the resistive coating completely or partially covers the housing outer surface.

11. The switching device as claimed in claim 9, wherein the refraction-controlling coating is disposed at least partially outside the resistive coating.

12. The switching device as claimed in claim 1, wherein the refraction-controlling coating has a layer thickness of less than/equal to 5 mm.

13. The switching device as claimed in claim 1, wherein the refraction-controlling coating has a layer thickness of less than/equal to 2 mm.

14. The switching device as claimed in claim 1, wherein the refraction-controlling coating is applied as a wet varnish.

15. The switching device as claimed in claim 1, wherein the refraction-controlling coating is applied as a powdered varnish.

16. The switching device as claimed in claim 1, wherein the switching device comprises a vacuum switch or a gas switch.

* * * * *